(12) United States Patent
Otterson et al.

(10) Patent No.: US 6,237,725 B1
(45) Date of Patent: May 29, 2001

(54) CART AUTOMATIC BRAKE MECHANISM

(75) Inventors: Daniel L. Otterson, Stacy; Gary Erickson, Forest Lake, both of MN (US)

(73) Assignee: Smarte Carte, Inc., White Bear Lake, MN (US)

( * ) Notice: Subject to any disclaimer, the term of this patent is extended or adjusted under 35 U.S.C. 154(b) by 0 days.

(21) Appl. No.: 09/536,048

(22) Filed: Mar. 27, 2000

Related U.S. Application Data

(63) Continuation of application No. 09/038,347, filed on Mar. 11, 1998, now Pat. No. 6,041,894.

(51) Int. Cl.[7] .............................. B62D 39/00; B62B 5/04
(52) U.S. Cl. ................... 188/19; 188/325; 280/33.994
(58) Field of Search .................... 188/2 D, 19, 21, 188/22; 74/491, 501.6, 523, 543, 545, 551.1, 552.2; 280/33.994, 47.2

(56) References Cited

U.S. PATENT DOCUMENTS

| | | | |
|---|---|---|---|
| 2,253,824 | * | 8/1941 | Townsend et al. ............. 188/21 |
| 2,755,396 | | 7/1956 | Lee et al. . |
| 2,958,537 | * | 11/1960 | Young ............................ 188/21 |
| 3,869,027 | * | 3/1975 | Chlebowski ................... 188/340 |
| 4,018,449 | * | 4/1977 | Anderson ....................... 188/19 |
| 4,059,779 | | 11/1977 | Wistinghausen . |
| 4,840,388 | * | 6/1989 | Doughty ..................... 280/33.994 |
| 4,976,447 | * | 12/1990 | Batson ....................... 280/33.994 |
| 5,090,517 | * | 2/1992 | Doughty ........................ 188/19 |
| 5,288,089 | * | 2/1994 | Bowers et al. ............. 280/33.994 |
| 5,325,938 | * | 7/1994 | King ............................... 188/19 |
| 5,433,464 | * | 7/1995 | Hlebakos .................... 280/47.27 |
| 5,456,336 | * | 10/1995 | Bopp ............................. 188/17 |
| 5,499,697 | * | 3/1996 | Trimble et al. ................ 188/19 |
| 5,735,367 | * | 4/1998 | Brubaker ........................ 188/19 |
| 5,823,302 | * | 10/1998 | Schweninger ................. 188/19 |
| 6,041,894 | * | 3/2000 | Otterson et al. ................ 188/19 |

FOREIGN PATENT DOCUMENTS 461889   2/1937  (GB) .

* cited by examiner

*Primary Examiner*—Christopher P. Schwartz
(74) *Attorney, Agent, or Firm*—Merchant & Gould P.C.

(57) ABSTRACT

A nestable cart, of the type guided by a walking attendant, for conveying a material such as luggage. The cart has a frame and is supported by two rear wheels and a front rotatable caster. A brake is contained within each rear wheel. The brake is automatically engaged when the cart is left unattended. Movement of the handle disengages each brake. A cable connected between the handle and brake linkage disengages the brake shoe, allowing each wheel to freely rotate.

12 Claims, 7 Drawing Sheets

CART AUTOMATIC BRAKE MECHANISM

This application is a Continuation of application Ser. No. 09/038,347, filed Mar. 11, 1998, now U.S. Pat. No. 6,041,894 which application is incorporated herein by reference.

TECHNICAL FIELD

This invention generally relates to a braking mechanism for a wheeled cart. More particularly, the invention relates to an automatic brake that is fully contained within the rear wheel of a nestable cart.

BACKGROUND

Carts are used to transport items in commercial establishments, such as groceries in supermarkets and luggage in airports. Customers place their items into such carts in order to transport the items to their parked vehicle or other destinations. When customers are done with the carts, the carts are placed in central collection areas or simply left unattended. Often the central collection areas serve as rental and return stations such that the customer is reimbursed for returning a cart.

Unattended carts pose problems. Many existing carts do not have brakes. These unrestrained carts can roll freely and cause damage to both persons and property. This is of particular concern on train platforms, where an unrestrained cart can cause damage to the transportation system. The carts themselves also sustain damage thereby reducing the useful life of the cart. Therefore a brake system is needed that automatically engages when the cart is left unattended in certain installations.

Several attempts have been made to employ brakes in cart. Most existing cart brakes are attached to the cart frame and operate on the outside of the tire tread. A brake shoe presses against the tire tread to slow down the cart. This has several disadvantages. Furthermore, the rental and return mechanisms that identify the cart (to dispense a reward) and capture and release the cart require a very consistent wheel diameter. If the wheels wear more than 0.10 inches, the mechanisms will not work reliably. The tire tread is abnormally worn down, reducing the traction and ultimate safety of the cart. As the tread wears, brake performance is diminished. In addition, the wheels must be replaced at regular intervals which increases the overall cost of maintaining carts. Also, brake mechanisms acting on the outside of the wheel are more susceptible to damage. For example, the brakes can be easily struck by a foreign object such as a foot or other carts. Also, the tire tread tends to pick up debris, water and other contaminants which damages and reduces the overall effectiveness of the braking mechanism. Therefore a need exists for a durable brake which will not degrade the tire nor reduce the operational safety of the cart.

Nestable carts place certain demands on the braking system. First, the braking system must be compatible with the typical rental-return station. A common type of rental-return station accepts the rear wheel of a cart through a guided wheel slot. The wheel fits snugly within the slot and the slot opening is locked to prevent unauthorized access. The slot retains the cart for the next paying customer. A brake on the outside of the wheel will not easily fit within the guided wheel slot. Furthermore, the rental and return mechanisms that identify the cart (to dispense a reward) and capture and release the cart require a very consistent wheel diameter. If the wheels wear more than 0.100", the mechanisms will not work reliably. Even if the brake fits within the slot, it is highly susceptible to damage by the guided wheel slot. Therefore it is advantageous for the brake to located within the wheel.

Another requirement of nestable carts is the release of the braking mechanism. Carts are often nested together and returned to the central collection area in a long string of carts. When the carts are nested, all brakes must be released. Therefore, the brakes of the front cart must disengage when nested with another cart.

Therefore, a need exists for a durable cart brake mechanism that will automatically engage when left unattended. The brake must be compact enough to fit within a wheel and corresponding wheel track and the brake must disengage when nested with another cart to facilitate en masse cart movement.

SUMMARY

The present invention provides a brake for a wheeled cart. The cart has frame, a front caster, a pair of rear wheels, and a handle. The handle moves between a first and a second position. A cable is connected to the handle and extends downwardly to at least one rear wheel. The cable connects to a brake linkage. The brake linkage is contained within the rear wheel and is slidably mounted to a fixed plate within the rear wheel. The linkage has a first and second cam. A brake drum is attached to the inner surface of the rear wheel. A brake shoe shifts between an engaged position against the brake drum and a disengaged position away from the brake drum. The brake shoe engages when the handle is in the first position and shifts to a disengaged position when the handle lever is moved to the second position. The brake shoe has two curved shoe brackets, each having a pivot end and a free end. The shoe brackets pivot about a common brake shoe pivot pin. The outer surface of each bracket has a traction surface for contacting the brake drum and locking the wheel. Each bracket has a cam slot to slidably engage the respective first and second cam of the brake linkage. A spring connects between the free ends of the shoe brackets. The spring is in compression and forces the brake shoe against the brake drum when the handle is in the first position and the spring compresses such that each brake shoe surface is not contacting the brake drum when the handle is in the second position.

DETAILED DESCRIPTION

Figure 1:
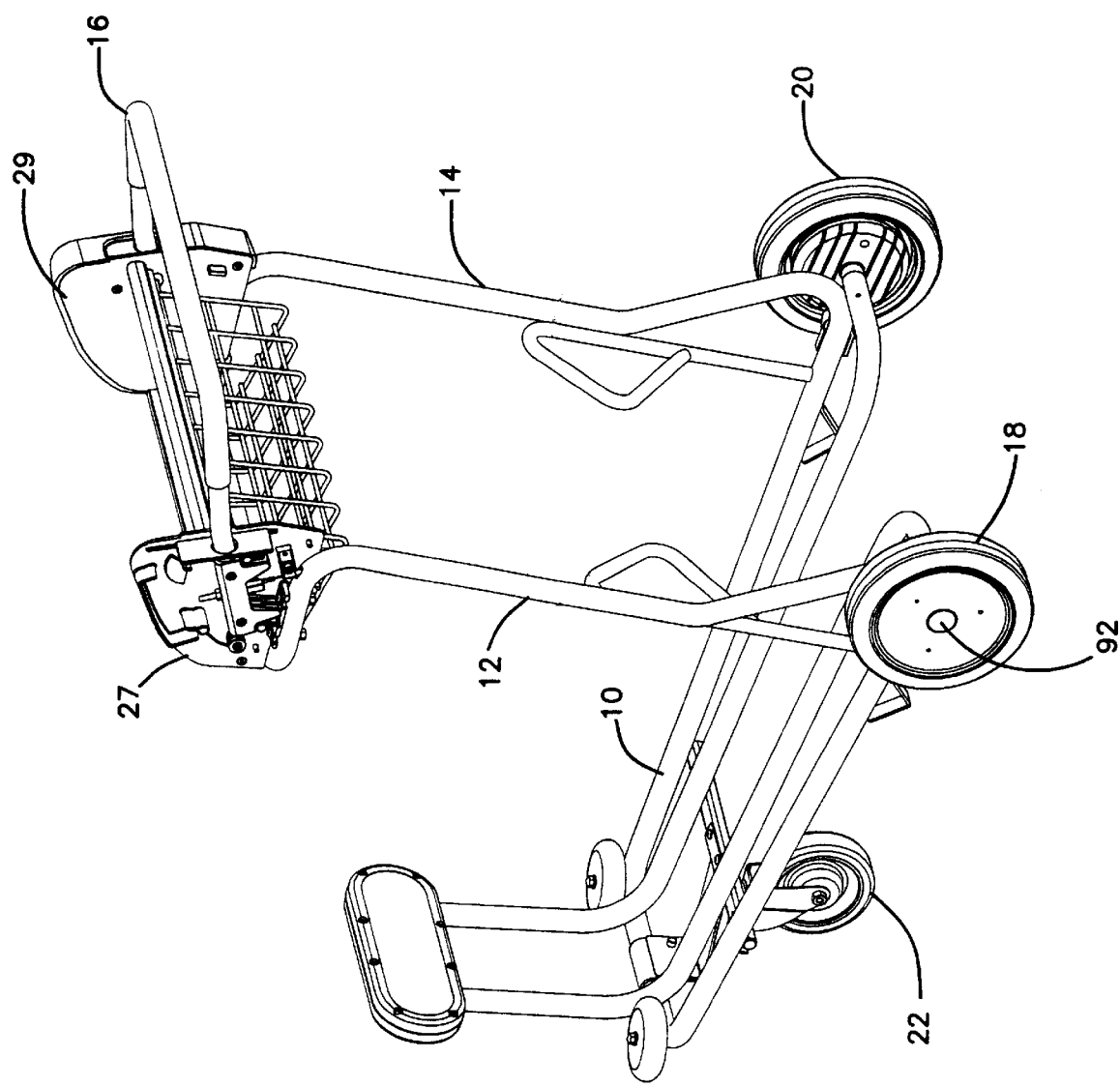
FIG. 1 is an isometric view of a cart employing a first embodiment of the braking mechanism of the present invention.

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

In general, the present invention relates to a brake mechanism for a wheeled cart. The brake is automatically engaged when the handle of the cart is released. The brake is fully contained within the rear wheel of the cart. In the preferred embodiment, each rear wheel of the cart has a brake. Each brake is disengaged when the handle is moved from the center position. Depending on the embodiment that is used, the invention allows for a more durable brake which is compatible with existing rental-return stations utilizing a guided wheel slot lock mechanism.

The present invention has many advantages. One advantage is that the brake mechanism will automatically engage when the cart is left unattended. This enhances the overall safety of the cart and ensures that the cart is not subjected to undue damage. Another advantage is that the brake fits inside the profile of the rear wheel. As a result, brake action is not affected by wheel wear nor does the brake inflict undue damage on the tire tread. This allows the cart to utilize an optimal tire possessing a hard and wear-resistant tread while still using a soft and aggressive brake/friction material. Brake performance is not affected by sand, moisture, or other damaging contaminants that are airborne or would be picked up by the tire tread. This lengthens the useful life of the brake. Another advantage is that the wheel is compatible with existing wheel lock rental-return stations which capture and release the rear wheel of the cart. In addition, the brake has improved performance because there is braking action in both the forward and reverse directions due to a double brake shoe design. The rear wheel brakes operate independently, ensuring that the cart will stop if one brake fails. Finally, the brake is easy to maintain and to replace.

Referring now to FIG. 1, a cart, generally shown as 100, is configured for transporting materials such as luggage. The cart 100 has a mainframe 10 having first and second vertical frame members 12, 14. A handle 16 is disposed between first and second vertical frame members 12, 14 for manual control of the cart. The frame is supported by the first and second rear wheels 18, 20 oppositely disposed at the rear end of the cart. A front rotatable caster 22 is mounted to the frame 10 and allows the cart to turn.

Figure 2:
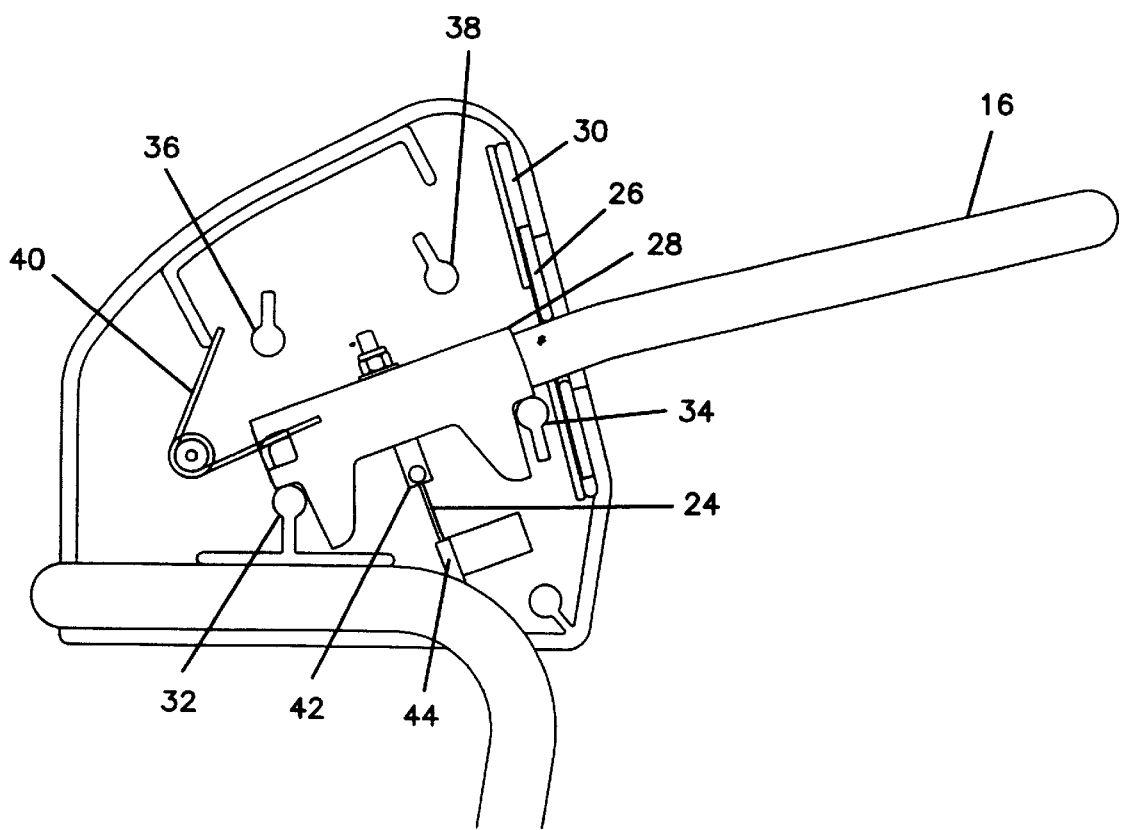
FIG. 2 is a schematic side view, partially in section, of a first embodiment of the apparatus of the present invention showing the handle in the center neutral position.
Figure 3:
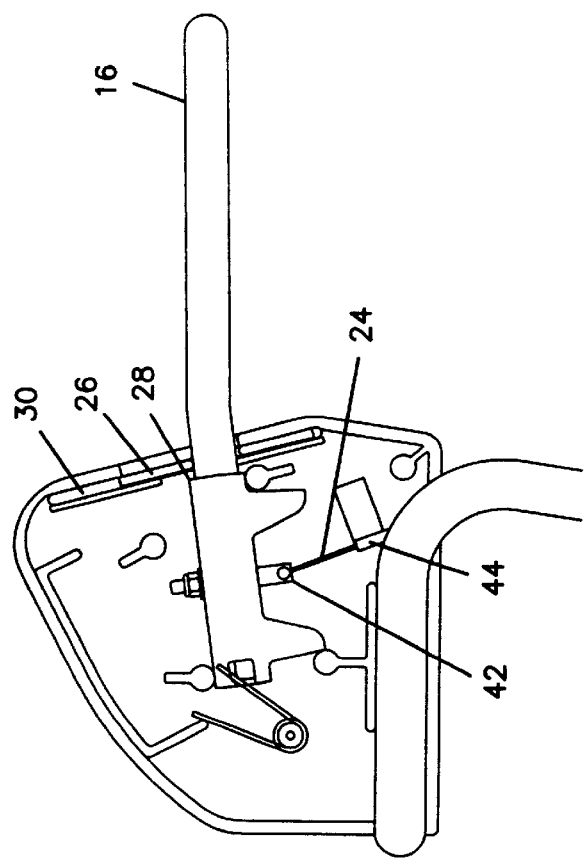
FIG. 3 is a schematic side view, partially in section, of a first embodiment of the apparatus of the present invention showing the handle in the up position.
Figure 4:
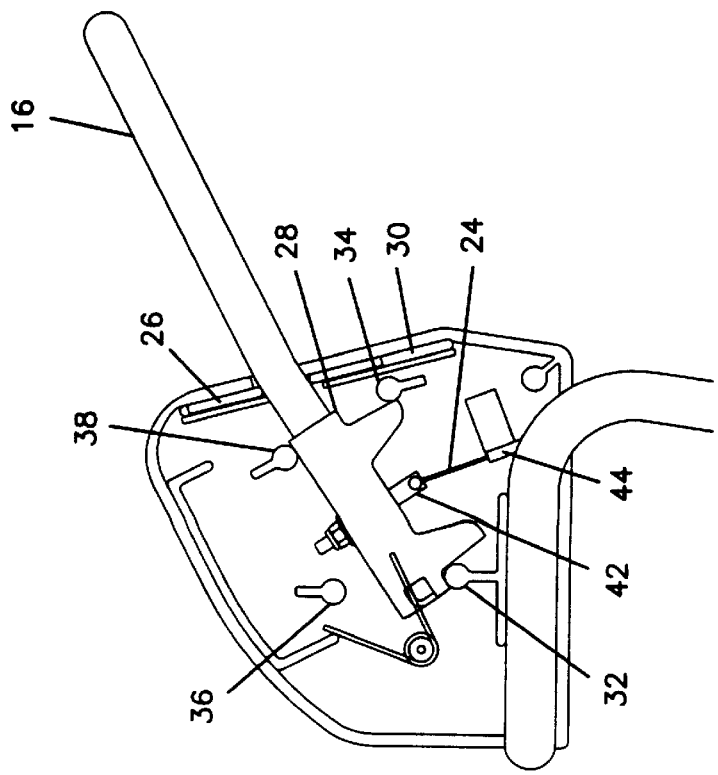
FIG. 4 is a schematic side view, partially in section, of a first embodiment of the apparatus of the present invention showing the handle in the down position

Referring now to FIGS. 2–4, which show a sectional view of the operation of the handle. FIG. 2 shows the handle 16 in the center position. In the center position, the brake is automatically engaged. When the handle 16 is moved from this center position, either upwards or downwards, the handle 16 pulls on a cable 24 which disengages the brake. FIG. 3 shows the handle in the up position and FIG. 4 shows the handle in the down position. The handle 16 connects to two handle activating mechanisms 27, 29. Each handle activating mechanism 27, 29 is located at the top of the respective first and second vertical frame members 12, 14.

The handle activating mechanisms 27, 29 are protected by a cover (not shown). Each handle activating mechanism 27, 29 and corresponding brake are identical. For clarity, only one set will be described herein.

The handle 16 passes through a bracket 26 and connects to a handle lever member 28. The bracket 26 is located within a slot 30, thereby allowing the handle 16 to slide upwards or downwards. The handle lever member 28 rotates between two positions, an upward position and downward position. The movement of the handle lever member 28 is restricted by first and second lower stops 32, 34 and first and second upper stops 36, 38. In the center position, the handle lever member 28 is supported by first and second lower stops 32, 34. When the handle 16 is moved to the upward position, the handle lever member 28 pivots at the first lower stop 32, and contacts the second upper stop 38. When the handle 16 is moved to the downward position, the handle lever member 28 pivots at the second lower stop 34 and contacts the first upper stop 36. A spring 40 biases the handle lever member 28 to maintain the handle in the neutral position such that the brake is engaged. The cable 24 is attached to the handle lever member by bracket 42. The cable 24 extends downwardly through the corresponding vertical frame member towards one of the rear wheels. The cable 24 is supported by cable guide 44.

Figure 5:
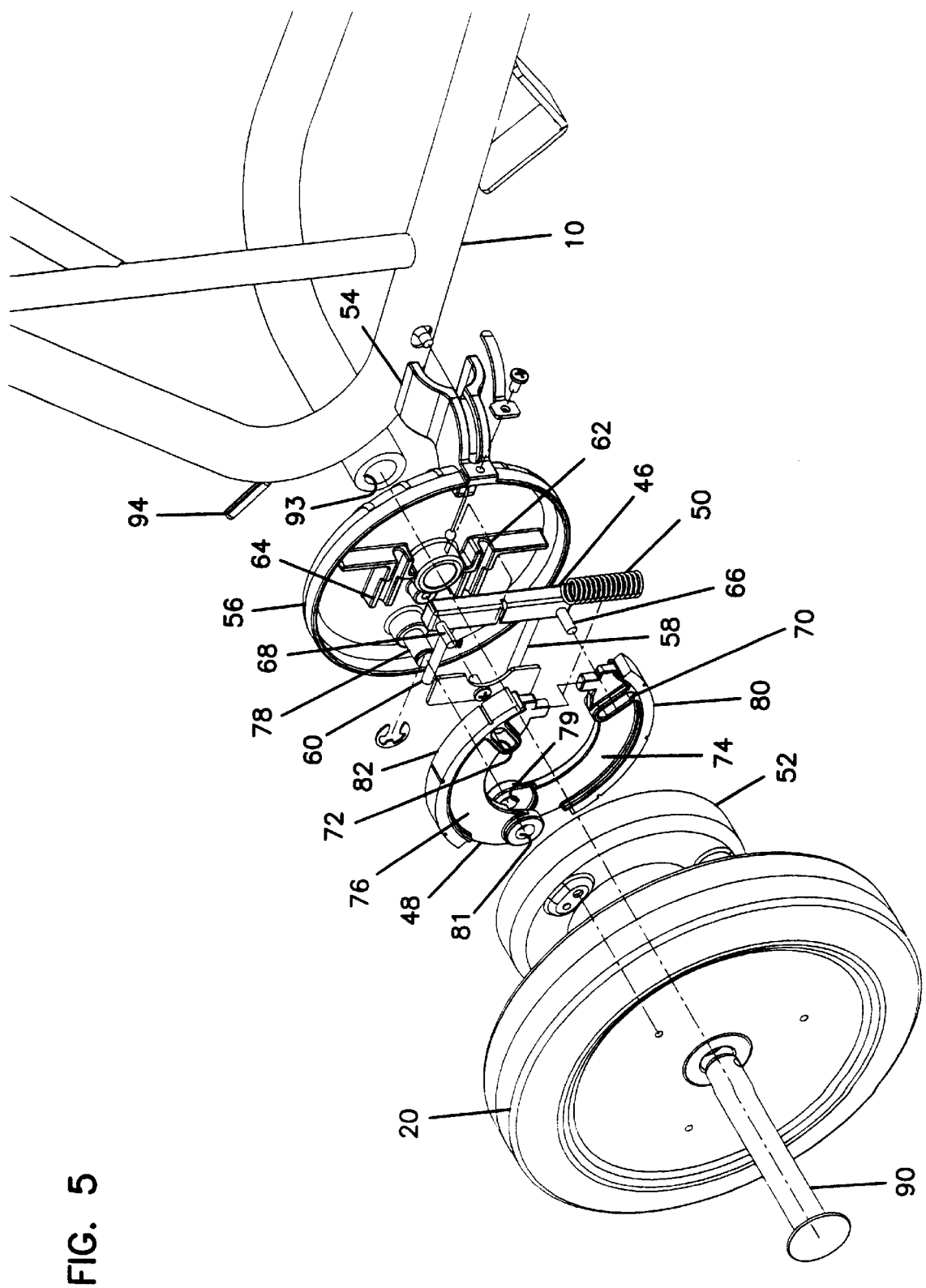
FIG. 5 is an enlarged sectional isometric view of a first embodiment of the braking mechanism of the present invention.
Figure 6:
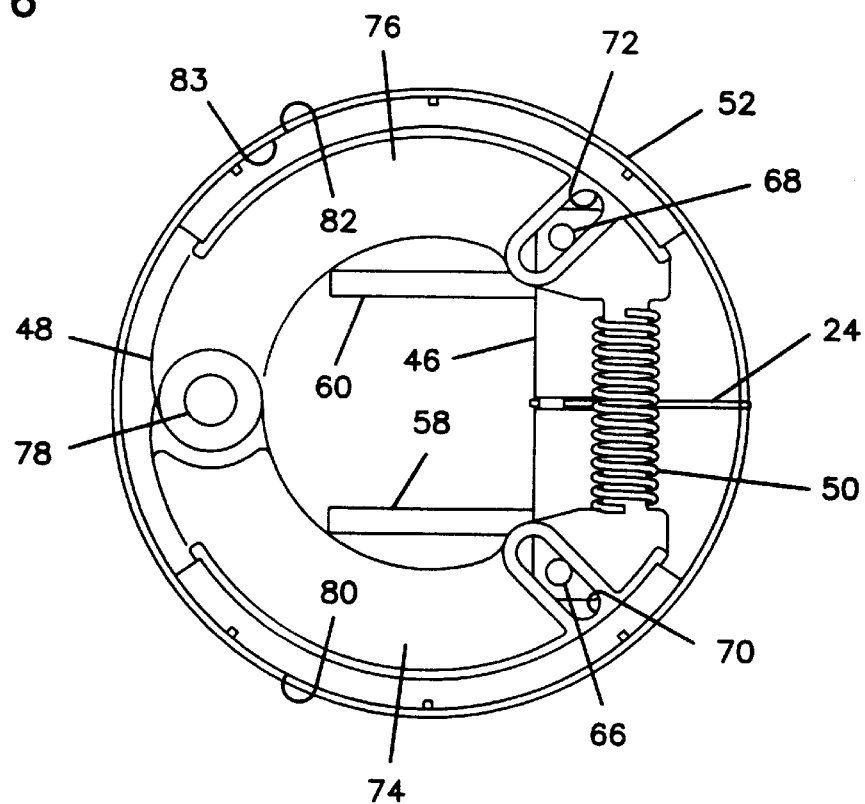
FIG. 6 is schematic side view, partially in section, of a first embodiment of the apparatus of the present invention showing the brake engaged.
Figure 7:
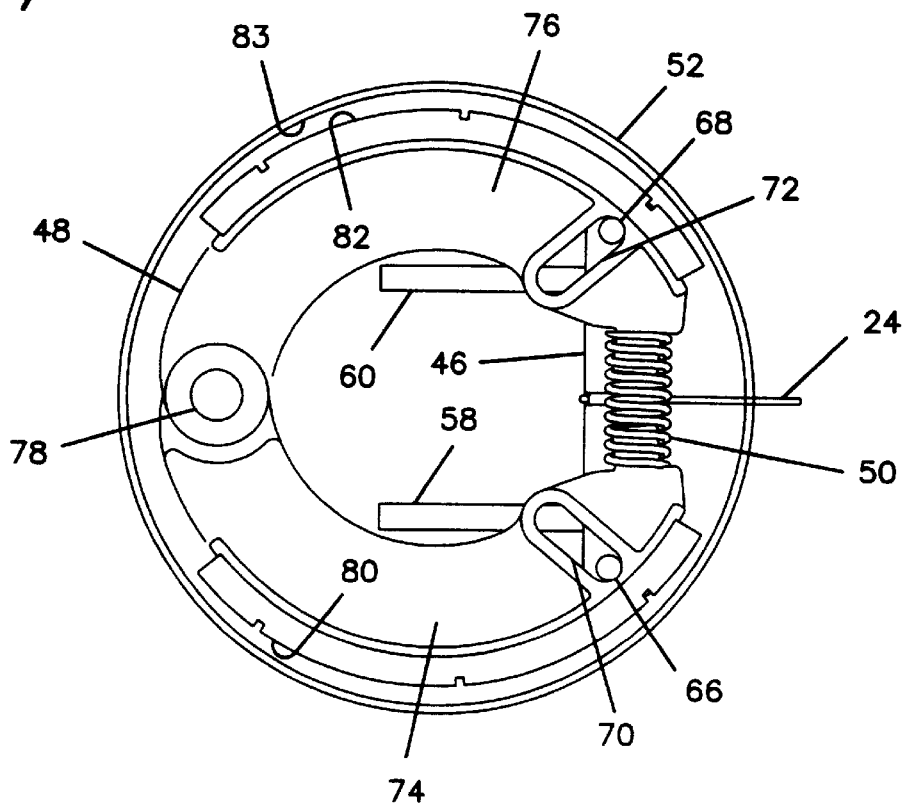
FIG. 7 is a schematic side view, partially in section, of a first embodiment of the apparatus of the present invention showing the brake disengaged.

FIGS. 5–7 show the structure and operation of the brake. The general operation of the brake will be described and a detailed description will follow. The cable 24 connects to a linkage 46. The linkage is slidably engaged with a brake shoe 48. In the center position, a compressed spring 50 biases the brake shoe 48 against a brake drum 52 thereby preventing wheel rotation. This engaged position is shown in FIG. 6. When the cable is pulled, due to movement of the handle 16, the linkage 46 engages the brake shoe 48 thereby moving the brake shoe away from the drum 52. As a result, the brake is disengaged and the wheel is free to move. FIG. 7 shows the brake in the disengaged position.

Referring now to the detailed description of the brake, FIG. 5 shows on exploded view of the brake mechanism. The cable 24 exits from frame 10 guided by a brake bracket 54 and connects to the linkage 46. The brake bracket 54 attaches a brake mounting plate 56 to the frame 10. The brake bracket 54 is of rigid construction as is well known in the art. The linkage 46 is slidably attached to the mounting plate 56 such that the linkage 46 can move when pulled by the cable 24. In the preferred embodiment, the linkage has a first and second member 58, 60 that are adapted to slide within first and second groves 62, 64 located on the mounting plate 56.

The linkage 46 is configured to move the brake shoe 48 to a disengaged position. The linkage 46 has first and second cams 66, 68 adapted to fit within first and second slots 70, 72 located on the brake shoe 48. The brake shoe has first and second curved brackets 74, 76. Each bracket has a pivot end and a free end. The first and second curved brackets 74, 76 pivot about the brake shoe pivot pin 78. The pivot pin 78 fits within first and second holes 79, 81 located on the pivot end of the first and second curved brackets 74, 76. The first and second slots 70, 72 are located near the free end of the corresponding curved bracket. Each curved bracket 74, 76 has a brake surface 80, 82 attached to the outer surface of the bracket. The first and second brake surface 80, 82 are configured to contact the inside surface 83 of the brake drum 52. The first and second brake surfaces 80, 82 are of general design as is well known in the art. The brake surface material includes, but is not limited to polyurethane. The first and second brake surface, 80, 82 can be changed depending on the amount braking force needed. In addition, the first and second brake surfaces 80, 82 provide a double brake shoe design. This ensures that the cart has equal braking action in both the forward and reverse directions.

The spring 50 connects the free ends of the first and second curved brackets 74, 76. In the center position, the spring 50 is compressed thereby applying an outward force to each bracket which engages the brake. The spring 50 is of general construction as is well known in the art. The spring 50 is further compressed when the cable 24 pulls the linkage 46. The first and seconds cams 66, 68 slide within their respective grooves 70, 72 towards the brake drum 52 and away from the center of the wheel. This motion causes the curved brackets 74, 76 to pivot about the brake shoe pivot pin 78 towards each other and compress the spring 50. As a result, the brake shoe surfaces 80, 82 are moved away from the brake drum 52 allowing the wheel to rotate. The brake drum 52 is attached to the inside of the wheel 20. The inner surface 83 of the brake drum 52 has a braking surface compatible with the brake shoe surface. The inner surface 83 of the brake drum is designed as is well known in the art and is generally a harder material than the brake shoe surface. The brake drum material includes, but is not limited to stainless steel.

The wheel 20 rotates about its own axle 90. Similarly, rear wheel 18 rotates about a second axle 92. The axle 90 fits within bore 93 in the frame 10 and is held in place by axle pin 94. Axle pin 94 passes through the frame and axle 90 to hold the axle firmly in place. The entire wheel assembly can be removed by removing the axle pin 94. This provides easy access to the wheel for maintenance or replacement.

The cart of the present invention is nestable. Individual carts are nested together and guided in a long string of carts. The braking mechanism is designed such that a front cart's brake disengages when another cart is nested within the rear of the first cart. As can be seen in FIG. 1, the covers 27, 29 of the rear cart will push the handle of the front cart to an upwards position. In a long string of carts, only the rear cart's brake will be engaged.

Figure 8:
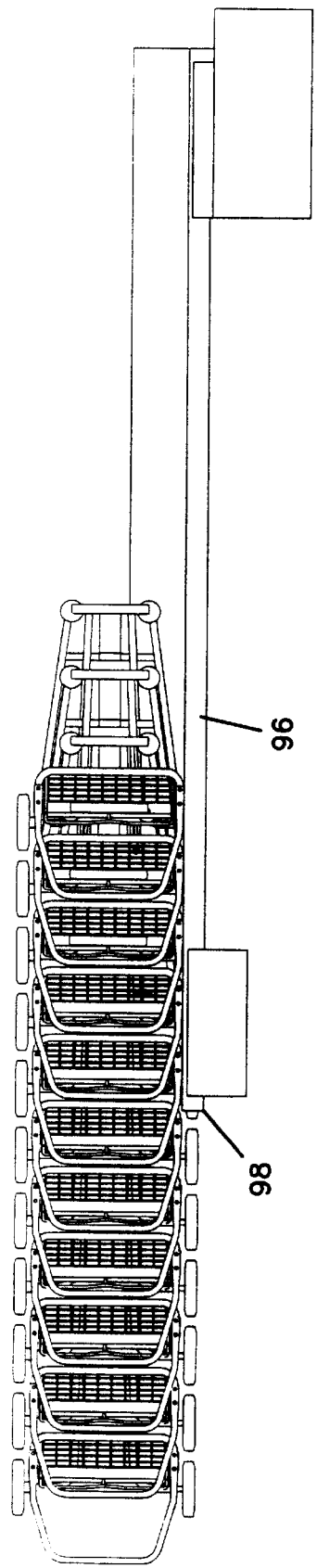
FIG. 8 is an schematic top view of a first embodiment of the apparatus of the present invention showing a string of carts contained in a guided wheel slot of a rental-return station.

FIG. 8 shows a string of carts retained within a guided wheel slot 96 of a typical rental-return station. The station accepts the rear wheel of the cart through the guided wheel slot 96. When depositing money, one cart is released from the wheel slot and when returning one cart, money is received. Such rental-stations are employed in airports to provide customers with an incentive to return the carts. The rental-return station is designed to provide proper security and to ensure that a cart cannot be removed unless money is deposited. Guided wheel slot 96 must be made of sufficient rigid construction such that the wheel slot will not be damaged by foreign objects and will not be damaged by the other carts in the slot. In addition, the wheel slots must have a tight enough tolerance so that the wheels cannot be removed from the slots. The brake mechanism of the present invention is designed to fit within a rear wheel of a cart such that the wheel can fit within a typical rental-return station. Within the wheel, the brake is protected from undue damages by the wheel slot and other carts.

Figure 9:
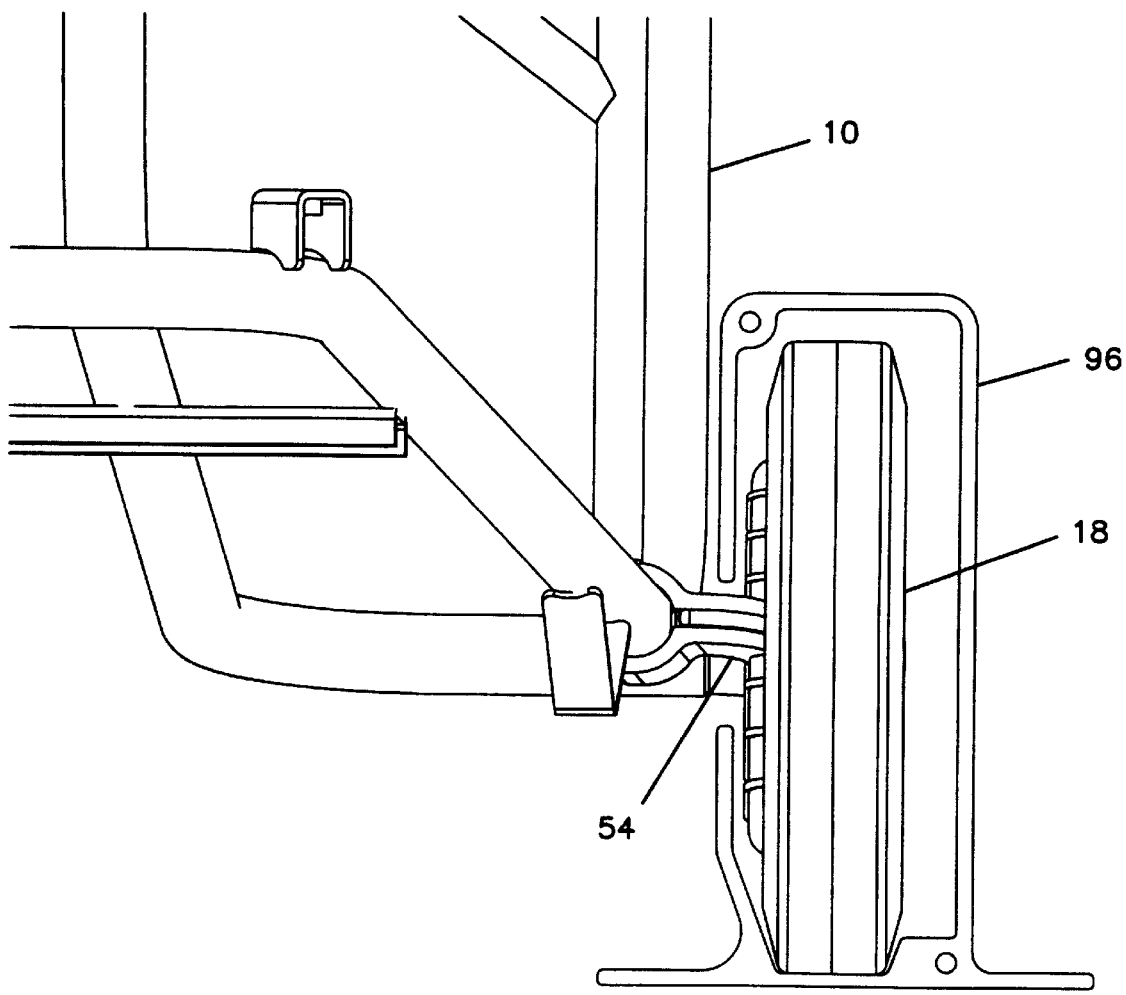
FIG. 9 is a front view of a first embodiment of the apparatus of the present invention showing a close-up of a wheel within a guided wheel slot.

FIG. 9 shows an enlarged front view of the wheel within the slot 96. The guided wheel slot 96 has an opening 98 configured to accept the cart. The brake bracket 54 is configured such that the wheel 18 fits within the guided wheel slot and the frame 10 remains outside the guided wheel slot.

Although the description of the preferred embodiment and method have been quite specific, modifications of the process of the invention could be made without deviating from the spirit of the present invention. Accordingly, the scope of the present invention is dictated by the appended claims, rather than by the description of the preferred embodiment and method.

We claim:

1. A cargo cart with an automatic wheel brake mechanism, the cart comprising a frame and rotatable wheel, the wheel mounted to the frame by a central axle, the wheel brake mechanism comprising:

a brake drum forming an inner surface of the rotatable wheel;

a brake shoe; and a mounting plate adjacent the rotatable wheel and operatively mounting the brake shoe relative to the brake drum, the mounting plate fixedly connected to the frame by a mounting brake bracket, wherein the rotatable wheel, central axle, mounting plate and mounting brake bracket aligned to cooperatively fit within a guided wheel slot of a cart retention station.

2. The cargo cart with an automatic wheel brake mechanism of claim 1, wherein the brake shoe has first and second curved brackets, each bracket having a pivot end and a free end, the pivot end of each curved bracket pivoting about a common brake shoe pivot, an outer surface of each bracket having a brake shoe surface for contacting the brake drum and locking the wheel, each bracket having a cam slot configured to slidabiy engage a respective first and second cam.

3. The cargo cart with an automatic wheel brake mechanism of claim 2, further comprising:

a linkage assembly comprising spring connected between the free ends of the first and second curved brackets, the linkage assembly being operable to move the spring between a first position and a second position; in the first position, the spring being in a spring first position forcing the brake shoe against the brake drum; in the second position, the spring being in a spring second position such that each brake shoe surface is not contacting the brake drum.

4. The cargo cart with an automatic wheel brake mechanism of claim 3, further comprising:

a handle mounted to the frame, the handle being moveable between a first position and a second position; and a coupling connecting the handle to the linkage assembly, wherein when the handle is in the handle first position, the spring is in the spring first position, and when the handle is in the handle second position, the spring is in the spring second position.

5. The cargo cart with an automatic wheel brake mechanism of claim 4, wherein the coupling is a cable.

6. The cargo cart with an automatic wheel brake mechanism of claim 3, wherein the linkage assembly further comprises:

a brake linkage disposed between the mounting plate and the brake drum, wherein the brake linkage has a main member and two parallel rods extending perpendicular to the main member, the main member having first and second ends, the first cam located at the first end, and the second cam located at the second end.

7. The cargo cart with an automatic wheel brake mechanism of claim 6, the mounting plate comprising two parallel grooves, the grooves configured to slidably engage the parallel rods of the brake linkage.

8. The cargo cart with an automatic wheel brake mechanism of claim 1, wherein the rotatable wheel has a width between about 2.0 cm and 4.0 cm, and a diameter between about 15.0 and 25.0 cm.

9. The cargo cart with an automatic wheel brake mechanism of claim 1, wherein the cargo cart has at least one rear wheel and wherein the rotatable wheel having the brake mechanism is the at least one rear wheel.

10. The cargo cart with an automatic wheel brake mechanism of claim 1, wherein the frame of the cart is configured so that a second cart nests within the rear of the cart.

11. A cargo cart with a wheel brake mechanism, the cart having a flame, a front castor, and a pair of rotatable rear cantilevered wheels, the cart nestable with a second cart; the wheel brake mechanism comprising:

a brake drum forming an inner surface of at least one of the rotatable rear cantilevered wheels;

a brake shoe configured to shift between an engaged position against the brake drum and a disengaged position away from the brake drum;

a mounting plate disposed between the frame and the one rotatable wheel, the mounting plate mounting the brake shoe thereon; and a brake mounting bracket fixedly attaching the mounting plate to the frame, wherein the at least one rotatable rear cantilevered wheel, mounting plate and mounting brake bracket fit within a guided wheel slot of a cart retention station.

12. The cargo cart with a wheel brake mechanism of claim 11, the cart further comprising a brake linkage slidably attached to the mounting plate.

* * * * *

UNITED STATES PATENT AND TRADEMARK OFFICE
CERTIFICATE OF CORRECTION

PATENT NO.      : 6,237,725 B1                                      Page 1 of 1
DATED           : May 29, 2001
INVENTOR(S)     : Otterson et al.

It is certified that error appears in the above-identified patent and that said Letters Patent is hereby corrected as shown below:

Column 1,
Line 38, delete "(to dispense a reward)" after the word "cart"
Line 50, "damages" should read -- damage --
Line 50, "reduces" should read -- reduce --
Line 63, delete "to dispense reward" after the word "cart"

Column 4,
Line 47, "member" should read -- rods --

Column 5,
Line 37, "covers" should read -- handle activating mechanism --
Lines 58-59, "damages" should read -- damage that may be caused --

Column 6,
Line 29, "slidabiy" should read -- slidably --

Column 7,
Line 11, "flame" should read -- frame --

Signed and Sealed this

Sixth Day of August, 2002

Attest:

JAMES E. ROGAN
Attesting Officer    Director of the United States Patent and Trademark Office